March 24, 1959 J. C. DEE 2,878,938
SWIMMING POOL FILTER
Filed April 2, 1957 2 Sheets-Sheet 1
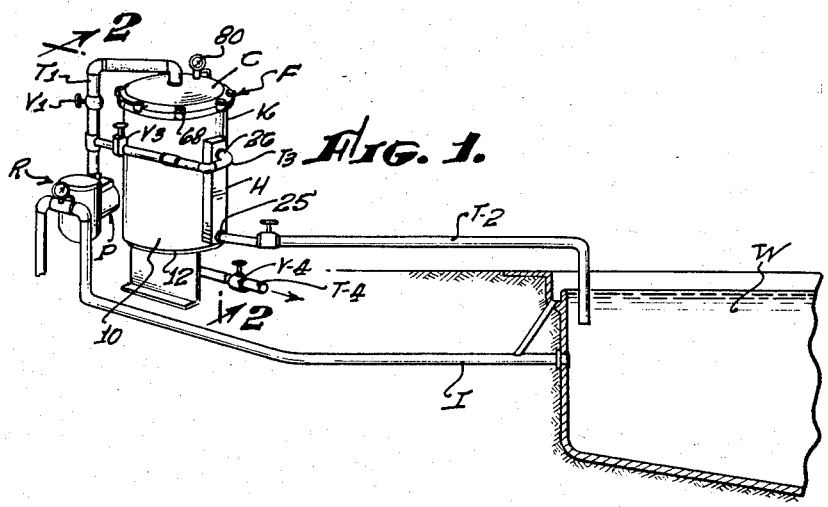
JOHN CHANDLER DEE,
INVENTOR.
BY
William C. Babcock
ATTORNEY.

March 24, 1959 J. C. DEE 2,878,938
SWIMMING POOL FILTER
Filed April 2, 1957 2 Sheets-Sheet 2
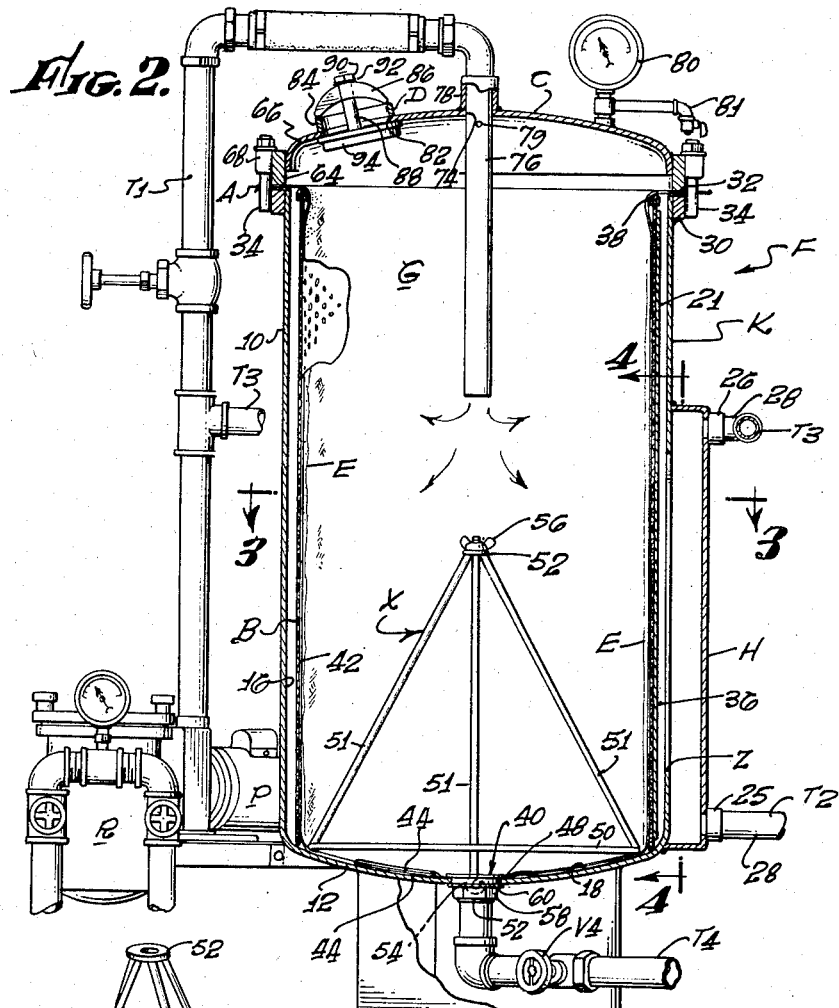
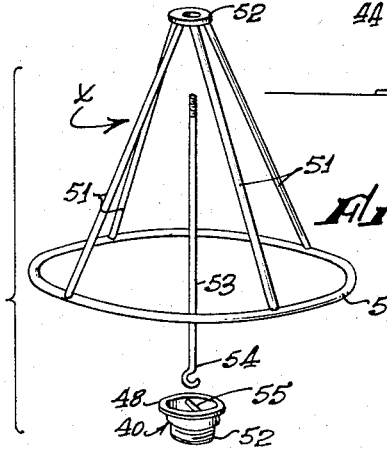
JOHN CHANDLER DEE,
INVENTOR.
BY William C. Babcock
ATTORNEY.

United States Patent Office 2,878,938
Patented Mar. 24, 1959

2,878,938
SWIMMING POOL FILTER

John Chandler Dee, Long Beach, Calif.

Application April 2, 1957, Serial No. 650,150

4 Claims. (Cl. 210—193)

The present invention relates to the field of swimming pool filters and more specifically to a novel diatomite filter having improved operation and whose maintenance is greatly simplified.

This application is a continuation-in-part of my copending application Serial No. 566,400 filed February 20, 1956, now abandoned.

Although in the past a number of simplified diatomite filters have been devised and marketed that are adapted for residential or private swimming pool use, these filters have presented maintenance problems of such magnitude that the owners thereof are prone to delay cleaning thereof until the last possible moment.

As is well known, in diatomite filters the filtering medium must be regularly replaced. The used charge of diatomaceous earth must be flushed from the filer so that a new charge thereof can be introduced, but in previously available small swimming pool filters of this type, the used diatomite can be removed only after disassembly of the filter to allow removal of the container in which the diatomite is disposed.

The container is ordinarily made of fabric and requires external rigid support when disposed in the filter. Consequently in removal of the container it is abraded by its support and frequently torn so that it must be replaced. Moreover, the removal of the container is sometimes attempted before all water has drained therefrom. In that event, the container with its load of used diatomite and water is a cumbersome burden, and the contents thereof are frequently spilled, causing an unsightly dispersion of debris adjacent the swimming pool. Thus it will be seen that changing the filter element of the previously available diatomite filters is a bothersome chore for the owner of a private swimming pool and one that the owner tends to avoid. Obviously, improper maintenance of the filter leads to an unsightly pool, permitting an unsanitary accumulation of algae, silt and bacteria.

In previously-known filters a source of great difficulty has been that the cloth filter bag has often been burst during the operation of the filter, requiring the labor and expense of its replacement. This difficulty has been known to occur hundreds of times, and experience has shown that a brand new bag made of exceptionally strong fabric is about as likely to be broken as any other bag. The breaking of the bag always occurs in the bottom portion thereof. In approximately 95% of the observed cases the breaking of the bag occurred during a transient condition immediately after the pump had first been turned on.

An important object of the present invention, therefore, is to provide a swimming pool filter in which water is forced under pressure through a cloth filtering bag, and including means for preventing the bursting of the bag during transient conditions of operation.

A further object of the present invention is to provide a diatomite swimming pool filter that can be maintained in sanitary condition by a simple procedure that requires no special knowledge or technique so that the private pool owner can operate same to insure the sanitary condition of his pool.

Another object of the invention is to furnish a swimming pool filter of this type of extremely low cost for initial installation and operation whereby the greater use of diatomite filters for residential pools is encouraged.

Yet another object of the invention is to make available a diatomite filter for swimming pools in which a new charge of diatomaceous earth may be placed therein and a used charge of diatomite expelled therefrom without disassembly of the device so that the periodic cleaning thereof is accomplished without any danger of injury to any part thereof.

These and other objects and advantages of the invention will be readily apparent from the following description of the presently preferred form thereof and from the drawing illustrating that form in which:

Figure 1 is an elevational view of a complete swimming pool filtering system incorporating my novel filter;

Figure 2 is an enlarged vertical cross-sectional view of my filter, including a closed cylindrical tank having a cylindrical screen and a filter bag disposed therein;

Figure 3 is a horizontal cross-sectional view of the device taken on the line 3—3 of Figure 2;

Figure 4 is an enlarged partial vertical cross-sectional view taken on the line 4—4 of Figure 2 showing the construction of the outlet manifold of the tank;

Figure 5 is an enlarged partial vertical cross-sectional view of the shoulder of the tank; and Figure 6 is a perspective view of a device for clamping the bottom of the bag to the bottom of the tank. Referring now to the drawing for the general arrangement of the invention and in particular to Figure 1 thereof, it will be seen that my filter, designated generally by the letter F, is but one component of a complete swimming pool filter system. The complete system includes a motor-driven pump P, and a hair and leaf trap R, in addition to filter F. An intake conduit I conducts water from the overflow gutter and lower portion of pool W to trap R where larger solid particles are removed. Pump P then raises the water through a conduit T1 to be introduced under pressure into the top of filter F, where it is filtered to be returned through outlet conduit T2 to pool W.

As can be seen by reference to Figure 2, filter F consists generally of an upwardly opening tank K whose top is closed by a cover C that communicates with said inlet conduit T1 to receive relatively unfiltered water therefrom. A rigid, porous cylindrical member B is vertically disposed in tank K that defines an annular space therewith, said member serving to rigidly support filter bag G that prevents unfiltered water from flowing directly into said annular space, first diverting it into said bag. Under the force of water circulating through filter F a charge of diatomaceous earth placed in bag G through an access door D formed in cover C will build up into a layer or filter bed E thereof on the interior surface of said bag, such as is indicated in Figure 2. Water passing through filter bed E is purified prior to entering the annular space between member B and tank K. By means of a vertically extending opening Z in the sidewall of tank K, said annular space communicates with an outlet manifold or chamber H connected to the exterior of said tank which chamber in turn leads into said outlet conduit T2. Chamber H draws filtered water from substantially every portion of said annular space for return to pool W.

The filter system also includes a conduit or pipe T3 interconnecting pump P and the upper end of manifold H. Pipe T3 has a cut-off valve V3 mounted thereon. A drain or clean-out pipe T4 having a shut-off valve V4 mounted thereon is connected to the bottom of tank K and communicates with the interior of bag G.

It is to be understood that the filter system is not operated continuously but only intermittently during the cycle of life of the diatomite charge. The life of such a charge may vary from a week to a month, depending upon the amount of usage of the pool. To remove a used charge of diatomite discharge valve means V4 are connected to the bottom of bag G through which the residue of diatomite and dirt can periodically be removed. When valve means V4 are opened, a forceful stream of water can be directed via access door D onto the interior surfaces of bag G to flush said residue through said valve means into a sewer or other waste receptacle, leaving filter F ready for a new charge of diatomite. Alternatively, valve V1 may be closed and valve V3 may be opened, and water pumped in the reverse direction through the filter and hence into the drain or sewer pipe T4.

Tank K can best be seen in Figure 2 and consists of a vertically disposed cylinder 10 having a substantially hemispherical or domed bottom member 12 sealing its lower end. Cylinder 10 and bottom 12 are preferably made of a mild sheet steel material and are joined together by a horizontal seam weld in order to define a substantially integral structure of sufficient strength to withstand the internal pressures to be exerted therein. The interior surfaces 16 and 18, respectively of said cylinder and bottom, should preferably be protected against the highly corrosive action of chlorinated water by a lining of sheet rubber or plastic. In a vertically extending area of cylinder 10 a V-shaped opening Z communicates with manifold H, as shown in Figure 4. The opening extends vertically a distance almost equal to the height of said cylinder, with the point of the V being at the bottom and the wide part at the top.

Chamber H is an elongate, substantially rectangular box-like housing of substantially U-shaped cross-section having an outer wall 22 and opposite side members 24, and is also preferably made of a mild steel sheet material and welded to said cylinder. In the center of outer wall 22 outlet ports 25 and 26 are formed, at the bottom and the top thereof, respectively, which are adapted to receive threaded tubular fittings 28 connected to conduits T2 and T3, respectively.

The advantage of the V-shaped opening Z is that water at the upper level of the opening, being under relatively lower pressure, has a larger area through which to flow, while water at the lower end of the opening which is under greater pressure finds a smaller area through which to flow. Thus, the filtering action tends to be uniform from the top of the filter bag to the bottom.

The shape of opening Z can best be seen in Figure 4 where it can also be seen that a small hole 19 in the wall of tank provides an opening into the manifold. The advantage of this hole is that pratically all of the water in the filter can be drawn out through conduit T2, thus reducing to a minimum the amount of water which must be released down the drain when it is desired to empty the tank.

A baffle member 21 is fastened on the outer surface of cylinder B and has sufficient width and depth to cover all of the surface of cylinder B which lies immediately behind manifold H. The baffle member is preferably made of a solid sheet material and welded along its two vertical edges to the outer surface of member B. Thus during the backwash operation water which enters the manifold under pressure through conduit T3 is not forced directly against the adjacent area of the filter bag but is dispersed by baffle member 21 so that it flows out in all directions into annular space 36. Baffle member 21 is in direct contact with the surface of member B only at its vertical edges, and stands out a short distance away from member B so that during normal filtering operation water is permitted to flow through the side wall of the filter bag adjacent the manifold in the same manner as throughout the other portions of the tank.

At the upper end of tank K on the outer surface of cylinder 10 a metal ring 30 is welded thereto whose upwardly facing edge 32 lies in substantially the same horizontal plane as the upper edge of said cylinder. Ring 30 extends completely around the open upper end of said tank and has rigidly fastened thereto a plurality of similar vertically disposed stud bolts 34. Said bolts are equally circumferentially spaced on ring 30 and the threaded upper ends thereof extend upwardly above edge 32 of said ring. As will presently appear, bolts 34 serve not only to provide means to fasten cover C to tank K, but also aid in supporting and locating filter bag G.

Cylindrical member B that is vertically disposed inside of tank K is formed of a perforated sheet or screen of metallic material that is porous enough to permit the free passage of water therethrough but sufficiently rigid to withstand, without deforming, the maximum pressure developed by circulating pump P. As has been indicated previously, member B is of appreciably smaller diameter than cylinder 10 and is adapted to rest on bottom 12, tending to center itself in the dome-like configuration of said bottom. When so disposed, member B defines an annular space 36 with interior surfaces 16 and 18 of tank K that extends vertically substantially the entire height of said tank. The upper edge of member B is reinforced by a U-shaped in cross-section circular member or gasket 38 fastened thereto that extends completely around said upper edge. Although member B is preferably made of a sheet material such as stainless steel, a heavy wire mesh would also be suitable for the purpose.

In the present embodiment of the invention, filter bag G is independent of member B but as will later be obvious, it could be attached thereto, because with my invention there is no necessity for removal of bag G everytime the filter is to be cleaned. The overall filter bag assembly includes bag G, flange A extending around the upwardly opening mouth thereof, and a tubular discharge fitting 40 extending downwardly from the closed bottom of said bag. The bag itself is made of a pliable sheet material that will readily pass water but which is substantially impervious to the passage of diatomaceous earth. Nylon or Orlon is well suited for this purpose and permits the diatomite to deposit itself thereon in the form of a filter bed E which is retained in bag G so that pool W will not become clouded with the presence of diatomite. A single sheet of nylon or the like forms the vertically extending tubular wall 42 of bag G, said wall being of approximately the same diameter as the internal diameter of member B so as to lie neatly thereagainst without appreciable creasing. At its lower end wall 42 has stitched thereto two round bottom pieces 44, concentrically arranged in layers, that are adapted to rest on bottom 12 of tank K. Pieces 44 have a centrally disposed hole cut therein adapted to open into discharge fitting 40. As can best be seen in Figure 6, fitting 40 is formed with an outwardly turned flange 48 that is adapted to fit over pieces 44 at the portions thereof defining the hole. It will be noted that bottom 12 of tank K has a hole formed in the center thereof through which the exteriorly threaded stub 52 of fitting 40 is adapted to extend downwardly therethrough.

Bag G is held firmly against the inner surface 18 of the bottom 12 of tank K by means of a hold-down frame X, shown in detail in Figure 6. Frame X includes a ring 50 which fits snugly within the inner periphery of the bottom of bag G. Ring 50 is arranged to expand outwardly against the bag, and for this purpose is preferably formed to include an expansion joint, not shown. A plurality of ribs 51 extend from ring 50 upward to the vertex of the cone, where they are rigidly fastened, preferably by welding, to a large washer 52. Washer 52 in turn is pulled firmly toward discharge fitting 40 by means of a hook-bolt 53. Hook-bolt 53 has on the lower end thereof a hook 54 which engages a cross-bar 55 in the upper end of fitting 40. The upper end of hook-bolt 53 is threaded and passes through washer 52 to be placed under tension by the tightening of an adjusting nut 56 thereon. Bottom pieces 44 of bag G are reinforced in the outer edges thereof, in order to provide greater strength in the circular section thereof which is clamped between ring 50 and the bottom of the tank.

Discharge valve means are connected to stub 52 on the outside of tank K. A manually operated valve V4 is coupled within a threaded pipe T4 that has an interiorly threaded collar 58 connected to its upper end. Collar 58 is turned to engage stub 52 and to compress between said collar and the lower surface of tank bottom 12 a circular sealing gasket 60 which effects a fluid-tight seal around the hole in the bottom of the tank.

Supporting of bag G in proper position in member B is accomplished by flange A. Said flange is a ring of the waterproof sheet material such as rubber whose inner edge is bonded to the upper edge of bag G and extends horizontally outward therefrom. Around its outer edge portion, flange A has a plurality of holes therein that are adapted to receive stud bolts 34. When flange A is so positioned on bolts 34 it rests on the upper edges of tank K and member B and thus forms a fluid seal at the upper end of annular space 36 whenever water is flowing through the filter. Consequently, water cannot enter annular space 36 without first passing through the diatomite filter bed E formed on the wall 42 of bag G.

Cover C cooperates with tank K when placed thereon to define a fully enclosed, watertight receptacle in which filtering of the water takes place. Said cover consists of a cover ring 64 of substantially the same diameter as tank ring 30 which is welded to the edge of a substantially hemispherical or inverted dome-shaped top 66. Cover C is supported in horizontally disposed position on top of tank K with flange A lying between cover ring 64 and tank ring 30 so that when said cover is clamped to said tank, flange A is compressed therebetween to effect a fluid-tight seal. Such clamping is accomplished by a plurality of U-shaped members 68 connected to cover ring 64 that are adapted to receive stud bolts 34 of tank ring 30. Each member 68 is welded to said cover ring in such a way that the laterally spaced arms thereof extend horizontally outward from said ring, stud bolts 34 then protruding upwardly above members 68. A washer 70 and nut 72 is fastened to each stud bolt 34 to engage said U-shaped members, thus forcing cover C to be tightly clamped to tank K.

Top 66 has a hole 74 formed in the center thereof from which a tubular member 76 extends both upwardly and also downwardly within the tank. An inlet fitting 78 is connected to member 76 and to intake conduit T1 to conduct unfiltered water to the interior of filter F under the pressure of circulating pump P. Inlet pipe 76 has a small hole 79 therein immediately below cover C, to act as a vacuum break as will be subsequently explained. In order that the internal pressure of filter F may be known at any given time, top 66 also mounts a pressure gauge 80. An air vent 81 communicating with the tank may be manually operated for permitting air to be forced out of or drawn into the top of the tank.

Access door D that is provided in cover C is adapted to permit both cleaning and loading of filter F. Many types of closure means could be utilized for this purpose, but the opening should be sufficiently large to permit insertion of a hose or charge of diatomite and also allow visual inspection of the interior of the device. In the present embodiment, top 66 is formed with a substantially oval opening 82 from whose edge a continuous sidewall 84 extends upwardly on the upper side of top 66. An elongate bar 86 rests on the top edge of said sidewall with its opposite ends on diametrically opposite portions of sidewall 84. A vertical bore is formed in the center of bar 86 that loosely receives an elongate threaded stud 88. A nut 90 is connected to the upper end of stud 88 and abuts a washer 92 beneath it that bears on the upper surface of bore 86. Pivotally connected to the lower end of stud 88 is substantially horizontally disposed plate 94 that is adapted to seal opening 82. Plate 94 is also oval in shape and its minor axis should be less than the major axis of opening 82 to permit removal of said plate in a well-known manner. When it is desired to close door D, tightening of nut 90 will securely clamp it into place.

The manner of use of my invention is extremely simple. After initial installation thereof, a predetermined volume of diatomite is inserted through door D. Pump P is then started and when water starts to discharge through said door, it is closed. Or door D may be closed and vent 81 kept open until water starts to discharge therethrough. Although the diatomite could be introduced in slurry form, this is not necessary since the normal circulation of water within the filter will cause a filter bed E of uniform thickness and even distribution to be rapidly built up on wall 42 of bag G. As is indicated by the arrows in Figure 2, unfiltered water flows into the interior of filter bag G and is forced through filter bed E to be purified thereby. The tubular form of the filter bed presents a large filtering area through which water may pass to enter annular space 36. By providing a separate outlet chamber H on the exterior of tank K, water tends to pass uniformly through all parts of filter bed E into said annular space and then into said chamber and out of filter F to be returned to pool W.

With use, filter bed E becomes loaded with the undesirable material which has been separated from the water. The flow of water is thereby restricted and the consequent increase in internal pressure of filter F is reflected in gauge 80. When such pressure reaches a predetermined value, the diatomite must be replaced. The cleaning of filter F and recharging with new diatomite is extremely simple with my invention. Assuming that the pump is off, discharge valve V4 is opened to drain the filter into a sewer or the like. Back-washing can then be accomplished through tube T3 by turning valve V1 off, valve V3 on, and turning on the pump. Or a hose can be inserted via door D into the filter to direct a forceful stream of water against the surface of bag G to flush away all used diatomite and dirt. Visual inspection through said door will indicate when all of the old filter bed E has been removed. Valve V4 is then closed and filter F is ready for a new charge of diatomite. In this manner my filter can quickly and easily be given the periodic cleaning required of diatomite filters without danger of any injury to parts thereof and without any disassembly thereof.

Although the operation of the filter has been described above with reference to supplying unfiltered water through conduit T1, an alternative possibility is to supply the unfiltered water under pressure to the interior of the filter bag via conduit T4 and valve V4. It would also be possible to supply water at both of these points simultaneously, if that were so desired. The principal advantage of using a different input point, however, is merely to provide proper circulation and turbulence of the water within the filter bag in such a way as to provide an even coating of diatomite on the inner surface of the bag and to obtain a uniform filtering action. My invention already accomplishes this by the use of inlet pipe 76 which extends downwardly from the top of the tank more than a third of the way to the bottom of the tank. Pipe 76 causes the main stream of water to be directed toward the bottom of the tank from whence it is reflected back up the sides of the tank, thus insuring an adequate coating of diatomite near the top of the filter bag.

Vacuum break 79 is necessitated only because of the use of inlet pipe 76 having a rather substantial length. The principal purpose of vacuum break 79 is to prevent water from being syphoned out of the tank back toward the pump.

The use of the hold-down ring 50 in conjunction with the cloth filter bag is absolutely necessary, as experience has shown. Otherwise the bottom of the bag tends to float upward and is torn away from discharge fitting 40 by hydrostatic pressure built up between the bottom of the bag and the bottom of the tank.

Although the form of the invention herein shown and described is fully capable of achieving the objects and providing the advantages hereinbefore mentioned, it is to be understood that it is merely illustrative of the presently preferred embodiment thereof and that I do not mean to limit myself to the details of construction herein shown and described other than as defined in the appended claims.

I claim:

1. A swimming pool filter for containing diatomaceous earth as a filtering media through which swimming pool water can be circulated, that is adapted to be cleaned of and recharged with said filtering media without disassembly thereof, that comprises: a closed cylindrical tank; inlet means through which unfiltered water can be delivered to the interior of said tank; a filter bag in said tank that defines an annular space between the interior wall surface of said tank and the exterior wall surface of said bag, said bag being made of a sheet material that is sufficiently porous to permit the passage of water and is substantially impervious to the passage of diatomaceous earth, the interior of said bag communicating with said inlet means to receive unfiltered water to be passed through diatomaceous earth disposed in said bag, and into said annular space; outlet means on said tank in communication with said annular space through which filtered water can be drawn from said space for delivery to a swimming pool; discharge valve means connected to the lowermost portion of said bag in communication with the interior thereof and extending downwardly therefrom to the exterior of said tank; and an access door on said tank that can be opened into communication with the interior of said bag to permit a forceful stream of water to be directed against the interior surface thereof so that when said discharge valve means is opened, said filtering media and the residue of dirt in said bag can be flushed therefrom, after which a new charge of filtering media can be inserted into said filter through said access door.

2. A swimming pool filter for containing diatomaceous earth as a filtering media through which swimming pool water can be circulated, that is adapted to be cleaned of and recharged with said filtering media without disassembly thereof, that comprises: an upwardly opening vertically disposed cylindrical tank having a closed lower end in which an opening is formed; a rigid cylindrical member of smaller diameter than the internal diameter of said tank that is vertically disposed in said tank so as to define an annular space therewith of substantially the same height as the depth of said tank, said member being formed of a sheet material that is porous to the passage of water; a cloth filter bag disposed in said member that is sufficiently porous to permit the passage of water therethrough and is substantially impervious to the passage of diatomaceous earth, said bag being of substantially the same diameter and length as said member so that the closed lower end thereof rests on said tank bottom; a circular flange of waterproof sheet material that is connected at the inner edge thereof to the upper open end of said bag to extend outwardly therefrom over the upper edges of said member and said tank to define a fluid seal at the end of said annular space and to support said bag in said member; discharge valve means connected to said closed lower end of said bag in communication with the interior thereof and extending downwardly therefrom through said opening in said lower end of said tank; outlet means on said tank in communication with said annular space through which filtered water can be withdrawn from said space for delivery to a swimming pool; a cover for said tank that comprises a substantially hemispherical dome of a rigid material having an inlet formed therein through which unfiltered water can be delivered to the interior of said bag; means to releasably hold said cover on the upper open end of said tank with said flange in fluid-sealing engagement therebetween; and an access door in said cover through which diatomaceous earth can be placed into said bag to be deposited as a filter bed on the interior surface of said bag when unfiltered water under pressure is introduced into said filter through said cover inlet, said water passing through said filter bed and bag into said annular space and outlet means, and said door further providing access to the interior of said bag to permit a forceful stream of water to be directed onto said formed filter bed so that when said discharge valve means is opened, said filter bed and any residue of dirt in said bag can be flushed therefrom.

3. A swimming pool filter as claimed in claim 2 which further includes a rigid ring disposed within the lowermost portion of said bag, and a holding frame fastened to said ring and to said discharge valve means for firmly clamping the bottom of said bag against the bottom of said tank.

4. A swimming pool filter as claimed in claim 3 which further includes means for reversing the flow of water therethrough, including an inlet pipe connected to said outlet means in communication with said annular space.

References Cited in the file of this patent

UNITED STATES PATENTS

| | | |
|---|---|---|
| 523,585 | Moore | July 24, 1894 |
| 1,585,246 | Hoy | May 18, 1926 |
| 2,570,131 | Koupal | Oct. 2, 1951 |
| 2,633,990 | Simpson et al. | Apr. 7, 1953 |
| 2,675,919 | White | Apr. 20, 1954 |